(12) United States Patent
Sievers et al.

(10) Patent No.: US 7,093,018 B1
(45) Date of Patent: Aug. 15, 2006

(54) METHODS, SYSTEMS, AND DATA STRUCTURES TO CONNECT SERVICES

(75) Inventors: A. Kent Sievers, Orem, UT (US); Lex B. Barfuss, Cedar Hills, UT (US); Steven T. Whitehouse, Pleasant Grove, UT (US); David L. Nuttall, Orem, UT (US); Scott M. Clayton, Spanish Fork, UT (US); Ralph Tse, Lindon, UT (US)

(73) Assignee: Novell, Inc., Provo, UT (US)

( * ) Notice: Subject to any disclaimer, the term of this patent is extended or adjusted under 35 U.S.C. 154(b) by 867 days.

(21) Appl. No.: 10/093,142

(22) Filed: Mar. 6, 2002

(51) Int. Cl.
*G06F 15/16* (2006.01)

(52) U.S. Cl. ..................................... 709/227; 709/217

(58) Field of Classification Search ................ 709/219, 709/217, 218, 229
See application file for complete search history.

(56) References Cited

U.S. PATENT DOCUMENTS

| | | | |
|---|---|---|---|
| 6,061,726 A | 5/2000 | Cook et al. | |
| 6,192,044 B1 | 2/2001 | Mack | |
| 6,246,409 B1 | 6/2001 | Veghte et al. | |
| 6,246,669 B1 | 6/2001 | Chevalier et al. | |
| 6,295,556 B1 | 9/2001 | Falcon et al. | |
| 6,314,793 B1 | 11/2001 | Webb et al. | |
| 6,494,831 B1 * | 12/2002 | Koritzinsky | 600/301 |
| 2002/0004832 A1 * | 1/2002 | Yoon et al. | 709/229 |
| 2003/0147350 A1 * | 8/2003 | Wookey et al. | 370/231 |
| 2003/0149870 A1 * | 8/2003 | Wookey et al. | 713/155 |
| 2003/0177259 A1 * | 9/2003 | Wookey et al. | 709/237 |

* cited by examiner

*Primary Examiner*—Krisna Lim
(74) *Attorney, Agent, or Firm*—Schwegman, Lundberg, Woessner & Kluth, P.A.

(57) ABSTRACT

Methods, systems, and data structures are provided to connect services. A local service attempts to connect with a remote service by first using an internal address for the remote service, where the internal address is used to establish a local connection between the local service and the remote service. If the internal address does not establish a connection, then an external address for the remote services is used. The external address is used to establish an external connection between the local service and the remote service. In one embodiment, a volatile memory associated with the local service is scanned initially to detect an internal or external address, which was last successfully used by the local service in establishing a connection with the remote service. In another embodiment, the internal address and the external address are updated by the remote service one the local service is connected with the remote service.

25 Claims, 4 Drawing Sheets

METHODS, SYSTEMS, AND DATA STRUCTURES TO CONNECT SERVICES

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in any drawings hereto: Copyright © 2002, Novell, Inc., All Rights Reserved.

FIELD OF THE INVENTION

The present invention relates to connecting services, and in particular to methods, systems, and data structures used to resolve one or more remote connection addresses used by a local service to connect with a remote service.

BACKGROUND OF THE INVENTION

Distributed computing has become commonplace in today's highly interconnected and networked environments. As a result, software services interface with one another via local network connections and external network connections. Generally, a local network connection exists if both a local service and a remote service are communicating within a secure environment (e.g., within a firewall, a virtual private network (VPN), a local area network (LAN), a wide array network (WAN), and the like). Similarly, an external network connection exists if the local service and the remote service are communicating within a less secure environment (e.g., outside a firewall, an Internet connection, and the like).

In today's ever-mobile society, organizations/service providers have gone to great lengths to ensure that their employees/customers have access to resources of the organizations/service providers at any time and any location. As a result, high-availability (HA) and remote access to software services is a top priority, since employees/customers are more likely to use the software services, if the time and place associated with any particular access are not restricted.

However, creating software services that can seamlessly communicate with one another through a local network connection and simultaneously through an external network connection remains problematic. This is so, because a local service requires a local address to establish a local network connection with a remote service and a different external address to establish an external network connection with the remote service. Moreover, as increased numbers of local services attempt to access remote services, the remote services must be replicated on multiple servers in order to handle additional processing associated with the additional local services. Each remote service replication is represented by a different address that must be used by an appropriate local service when attempting to connect with the remote service.

Furthermore, often the remote services will be moved or upgraded from one server to another server, and each move or upgrade results in address changes associated with the remote services. The address changes must be communicated to any affected local services. Generally, the address changes are manually administered, such as when a network administrator manually visits each client within a network having an affected local service and installs the changed address for a moved or upgraded remote service. This process is time and resource intensive, and therefore it is not desirable.

Alternatively, address changes can be communicated to an end user associated with an affected local service, and the end user can be relied upon to make the appropriate address changes for moved or upgraded remote services. Yet, this technique often creates more work for network administrators or network support groups, since often the end user is not adept enough to make the appropriate address changes for the remote services without requiring some phone/electronic mail (email) assistance from the network administrators or the network support groups. And, as one of ordinary skill in the art readily appreciates, even minimal address changes can create an untoward volume of phone calls/emails from confused and frustrated end users.

Moreover, conventional interactions between local services and remote services do not automatically distinguish or detect whether a particular connection type is a local network connection or a remote network connection. As a result, when connection types change, a local service will be unable to successful connect with a remote service until a manual address change is communicated to the local service. This can be especially frustrating for an end user.

For example, consider an end user having a local email service that connects and interfaces to a remote email service, where the remote email service manages the end user's email account. The local email service resides on a laptop computing device, that when docked interfaces with the remote email service via a local network connection (e.g., LAN within a firewall) using a local address for the remote email service. If the end user takes the laptop out of the docking station and attempts to connect with the remote email service through a standard Internet connection (e.g., outside the firewall), then the local email service will require the end user to manually change the local address for the remote email service to a remote address. Further, many first-time end users will not be aware of the needed address change, correspondingly these first-time end users will frantically attempt to get phone support to resolve the problem. Additionally, even experienced end users will be surprised when a previously used external remote address fails, because of a moved or upgraded server, which was not communicated to the end users.

Additionally, as a local service attempts to use a connection address to establish a connection with a remote service, if the used address is incorrect, then the end user is forced to endure a latency period of time while the local service waits for a time out communication indicated that the used address is not acceptable. Once the latency period of time lapses, the end user is finally informed that the address attempted was incorrect. Again, this is frustrating and time consuming for the end user, and even experienced end users will forget to change addresses, and correspondingly will be forced to endure this undesirable startup latency period of time before being able to connect with a desired remote service.

As is apparent, there exists a need for improved techniques that can automatically connect local services with remote services, irrespective of whether the local service is using a local network connection or an external network connection. Furthermore, there exists a need for techniques that better predict correct addresses for remote services, such that unwanted and undesirable startup latencies, associated with connecting local services to remote services, are minimized.

SUMMARY OF THE INVENTION

In various embodiments of the present invention, techniques for connection a local service with a remote service are described. An internal address associated with a local connection between the local service and the remote service is maintained and accessible to the local service. Moreover, an external address associated with an external connection between the local service and the remote service is maintained and accessible to the local service. A previously successful address associated with a previously successful connection between the local service and the remote service is acquired from a volatile memory, and used initially to attempt to connect the local service with the remote service. If the previously successful address fails, then the retained internal address is used. If the retained internal address fails, then the retained external address is used.

More specifically and in one embodiment of the present invention, a method to manage addresses for a remote service is provided. Initially, an internally accessible address and an externally accessible address for a remote service are retained during installation. Next, a memory is scanned for a previously successful address for the remote service. Further, the internally accessible address and the externally accessible address are refreshed when a connection is made to the remote service.

In another embodiment of the present invention, a method to connect with a remote service is presented. An attempt to connect to the remote service using a previously successful address associated with a previous connection to the remote service is made. Moreover, an attempt to connect to the remote service using an internal address associated with a local connection to the remote service is made. Also, an attempt to connect to the remote service using an external address associated with an external connection to the remote service is made. Additionally, an attempt to connect to the remote service using a modifiable address associated with a manually provided connection to the remote service is made. Finally, all attempts to connect to the remote service are terminated when a successful connection to the remote service is acquired.

In still another embodiment of the present invention, a connection system is provided. The connection system includes a local service, a remote service, and a connection set of executable instructions. First, the connection set of executable instructions attempts to connect the local service with the remote service using a local connection address for the remote service. If the connection attempt is unsuccessful, then the connection set of executable instructions attempts to connect the local service with the remote service using an external connection address for the remote service.

In yet another embodiment of the present invention, a remote connection data structure used to connect a local service with a remote service and residing on a computer-readable medium is presented. The data structure has a local service identifier used to uniquely identify the local service and an internal address associated with the local service identifier and used by the local service to establish a local connection to the remote service. Moreover, the data structure includes an external address associated with the local service identifier and used by the local service to establish an external connection to the remote service.

Still other aspects of the present invention will become apparent to those skilled in the art from the following description of various embodiments. As will be realized the invention is capable of other embodiments, all without departing from the present invention. Accordingly, the drawings and descriptions are illustrative in nature and not intended to be restrictive.

DETAILED DESCRIPTION OF THE INVENTION

Figure 1:
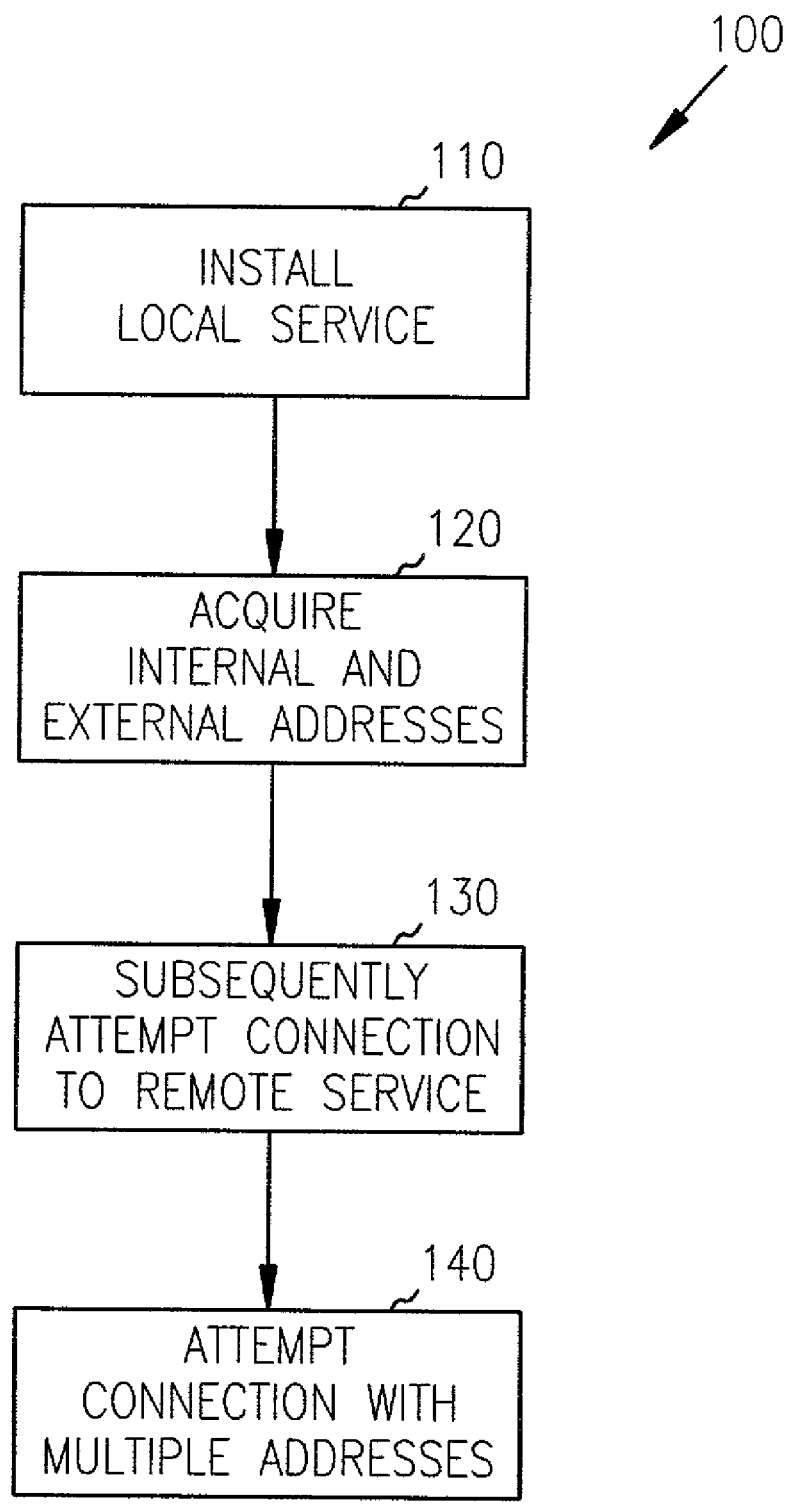
FIG. 1 is a flowchart representing a method for connecting services, according to the teachings of the present invention.

In the following description, reference is made to the accompanying drawings that form a part hereof, and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of the present invention. The following description is, therefore, not to be taken in a limited sense, and the scope of the present invention is defined by the appended claims.

Software for the system is stored on one or more computer readable media. In one embodiment the software is stored on secondary storage, such as a disk drive, and loaded into main memory and cache of the computer as needed. The software is written in the form of executable instructions that generally provide a single function or subsets of related functions. However, in various embodiments, the software comprises a single module or many modules, and there is no requirement that functions be grouped together. Hardware and/or firmware are used to implement the invention in further embodiments. The software may implement the functions, or simply facilitate the performance of the function by a human by providing menu driven interfaces, or other means of providing information to the system for data storage.

As used herein a "service" refers to one or more software applications that communicate with one another, such that a local service residing on a client-computing device requires access to a remote service residing on a server-computing device. Some readily recognizable services to one of ordinary skill in the art include email services, database services, Intranet services, document management services, and others. The services communicate via network connections that are local network connections or external network connections. Local network connections are more secure connections and/or environments where the local service and the remote service interface with one another (e.g., LANs, WANs, VPNs, or any other connection within a firewall where access from unauthorized services is more heavily restricted). Remote network connections are less secure connections and/or environments where the local and the remote service interface with one another (e.g., Internet connections, and the like).

In order to establish local or external connections between a local service and a remote service, the local service must obtain a valid communication address for the remote service. The communication address will uniquely identify the specific network (e.g., local domain or external domain) and device (e.g., server-computing device, or any computing device) that includes the remote service desired by the local service. Some readily recognizable addressing formats include IP addressing, Classless Inter-Domain Routing (CIDR) addressing, and others. All such addressing formats are intended to fall within the tenets of the present invention. Moreover, as one of ordinary skill in the art readily appreciates hypertext links represented as Uniform Resource Locator (URL) links within the World Wide Web (WWW) are translated into IP addresses or CIDR addresses to establish connections between a client and a host. Moreover, email addresses directed toward recipients and senders are converted into IP or CIDR addresses before being transmitted from one email client to another email client.

Furthermore in one embodiment, the present invention is implemented using a GroupWise email system distributed by Novell, Inc. of Provo, Utah. The email system includes email clients (e.g., local services) and email servers (e.g., remote services), accessible over local network connections and remote network connections. Moreover, in one embodiment the email system operates in a Netware operating system (OS) environment distributed by Novell, Inc. of Provo, Utah. Of course any email system, local service, remote service, or operating system can be used without departing from the teachings of the present invention.

FIG. 1 illustrates a flowchart representing one method 100 to connect services, according to the teachings of the present invention. Initially, a local service that is operable to communicate with a remote service is installed on a client-computing device in 110.

In one embodiment, the installation set of executable instructions includes a single variable address that is used by the installation set of executable instructions to establish initial contact with an addressing service. The addressing service, once contacted by an installing client-computing device, identifies the local service and the client-computing device and redirects communications between the installation set of executable instructions to an optimal server-computing device having the remote service that needs connected with the local service, which is presently being installed on the client-computing device. In this way, no manual addressing is required during installation of the local service on the client-computing device. Moreover, the centralized addressing service is more efficiently administered and modified by service providers, since any changes to addressing associated with available remote services can be made without manual intervention on the client computing device.

Once the local service is connected to an appropriate remote service, the remote service automatically updates a local address, associated with the local service connecting to the remote service via a local connection, and an external address, associated with the local service connecting to the remote service via an external connection. Further, in one embodiment, the remote service also updates the variable address associated with the addressing service. In this way, each time a valid connection between a local service and a remote service is established, all addresses used by the local service to establish a connection with the remote service are updated on the client-computing device. This further alleviates the need for manual intervention by a service provider/an end user on the client-computing device. Accordingly, when addresses associated with the addressing service, local connections, and remote connections are changed automatic corrections are made on the client-computing device.

At some later point in the time (e.g., after the initial installation of the local service on the client-computing device), the local service will once again attempt to establish a connection to the remote service in 130. The local service will not be capable of identifying whether the client-computing device requires a local connection or an external connection to connect with the remote service. Correspondingly, the local service makes multiple automatic connection attempts using multiple addresses associated with the remote service in 140.

In one embodiment, the local service makes a first connection attempt by scanning a volatile memory (e.g., cache), associated with the client-computing device, for a last-used and previously successful connection address for the remote service. If a previously successful address is detected, then this is a first address used by the local service in attempting to connect with the remote service. As one of ordinary skill in the art readily recognizes, it is more likely that a previous successful connection address used by the local service to connect with the remote service will be successful in establishing a connection with the remote service than any other available address, which is not manually supplied by an end-user of the local service. As a result, selecting a more likely address for the remote service on a first connection attempt minimizes latency associated with connecting the local service to the remote service.

Next and in more embodiments, if a memory-acquired address fails to establish a connection with the remote service, then the internal address, associated with local connections, is used. Again, most end-users are more likely to connect with the remote service on a more frequent basis using a local connection to the remote service. Thus, potential connection latency is further minimized by automatically selecting a more probably internal connection address after the memory-acquired address fails. If the internal address fails to establish a connection to the remote service, then the retained external address is attempted. Additionally, if the external address fails, then, in one embodiment, an end-user is prompted (e.g., pop-up window, and the like) to manually supply a connection address for the local service to try. If the end user is unable to provide a connection address, or alternatively supplies an unsuccessful connection address, then the originally installed variable address is used to make contact with the addressing service, to acquire a connection with the remote service.

Once a successful connection between the local service and the remote service is established, then all other connection attempts need not be pursued further. Moreover, the remote service updates the variable address, the internal address, and the external address within the local service residing on the client-computing device. Additionally, the address associated with the successful connection is available in the volatile memory for the next subsequent attempt made by the local service to connect to the remote service.

In some embodiments, it can be desirable to retain a previously successful connection address in non-volatile memory for later retrieval, if the specific usage habits of the local service are known to make such a situation beneficial. However, as one of ordinary skill in the art readily appreciates, it is probable that if an end user is switching from a local connection to an external connection, or vice versa (e.g., docking or undocking the client-computing device), then the end user is likely to power off the client-computing device and take the client-computing device in transit to a different physical location. In this way, by only retaining the previously successful connection address in volatile memory, in some embodiments of the present invention, a more accurate prediction and reflection of the connection habits of the end user is achieved. Moreover, the previously successful connection address can be associated with either an internal address for the remote service or an external address for the remote service.

Figure 2:
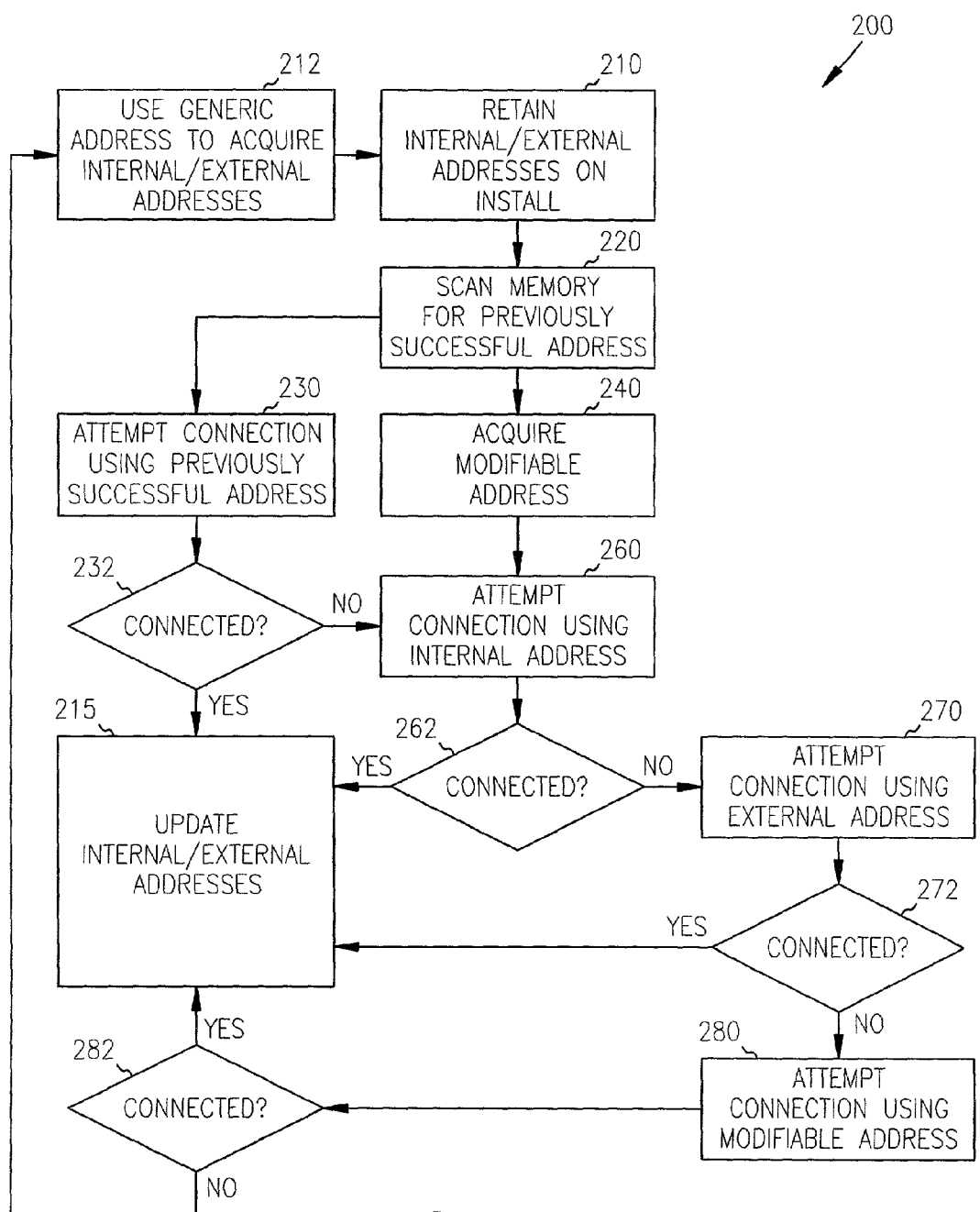
FIG. 2 is a flowchart representing a method to manage connection addresses for a remote service, according to the teachings of the present invention.

FIG. 2 illustrates a flowchart representing one method 200 to manage connection addresses for a remote service, according to the teachings of the present invention. A local service is installed on a client-computing device. The local service during some operational states requires a connection to a remote service residing on a remote server-computing device. In some embodiments the local service and the remote service are associated with email systems, Intranet systems, database systems, and other systems. Moreover, the connection between the local service and the remote service can occur via a local network connection (e.g., LAN, WAN, VPN, or any connection with a firewall where unauthorized access is restricted) or an external connection (e.g., Internet connection or any connection outside the firewall). Connections made from local network connections require a different connection address for the remote service than connections made from external network connections for the remote service.

During installation, an internally accessible address for a local network connection and an externally accessible address for an external network connection are retained in 210. In one embodiment, during installation of the local service on the client-computing device an installation provided generic address is initially given to the local service for purposes of redirecting the local service to an optimal address for the remote service. Moreover, in 212 once the local service is redirected to the remote service for an initial connection during installation, the internally accessible address and the externally accessible address are acquired by the local service from the remote service. Furthermore and in some embodiments, each time the local service successfully connects with the remote service, the internally accessible address and the externally accessible address are updated/refreshed within the local service in 215. Also, in one embodiment, the remote service can update/refresh within the local service the generic redirection address on each successful connection between the local service and the remote service.

After installation and each subsequent attempt that is made by the local service to connect with the remote service, results in a memory, associated with the client-computing device, being scanned in 220 for any previously successful connection address, which was last successfully used by the local service to connect with the remote service.

In one embodiment, the memory is a volatile memory (e.g., cache). Furthermore, in some embodiments, the memory is scanned for the previously successful connection address (e.g., internally accessible address or externally accessible address) as a first connection attempt in 230, before proceeding with attempts using different addresses for the remote service. And, once a successful connection between the local service and the remote service is made, all additional attempts to connect with the remote service are terminated. Accordingly, a check is made in 232 to determine if a successful connection between the local service and the remote service is achieved, and if so, then in 215 the internally accessible address and the externally accessible address are updated/refreshed by the remote service within the local service.

In 240, a modifiable address for the remote service is acquired. In one embodiment, the modifiable address is end user supplied and acquired during installation or during normal operation of method 200 when previous addresses fail to establish a connection between the local service and the remote service. In this way, the local service has a generic address used for redirection to the remote service, an internally accessible address used for local network connections to the remote service, an externally accessible address used for external network connections to the remote service, and a modifiable address used as a backup when the other available address fail to establish a connection to the remote service.

If the memory acquired previously successful address fails to establish a connection to the remote service in 232, then the local service attempts to connect to the remote service in 260 using the internally accessible address. A check is made in 262 to determine if the internally accessible address resulted in a successful connection, and if a successful connection is established, then in 215 the internally accessible address and the externally accessible address are updated/refreshed by the remote service within the local service.

However, if the internally accessible address fails to establish a connection to the remote service in 262, then the local service attempts to connect to the remote service in 270 using the externally accessible address. Accordingly, in 272, a check is made to determine if a successful connection is made, and if so, then in 215 the internally accessible address and the externally accessible address are updated/refreshed by the remote service within the local service.

In 272, if not connection is established using the externally accessible address, then in 280 the modifiable address is attempted to establish a connection with the remote service. Correspondingly, in 282 a check is made to determine if a successful connection is made, and if so, then in 215 the internally accessible address and the externally accessible address are updated/refreshed by the remote service within the local service.

If no addresses result in a connection to the remote service, then the method 200 attempts to use the generic redirection address provided during installation in 212 to establish a connection to the remote service and acquire a correct and updated internally accessible address and externally accessible address.

Figure 3:
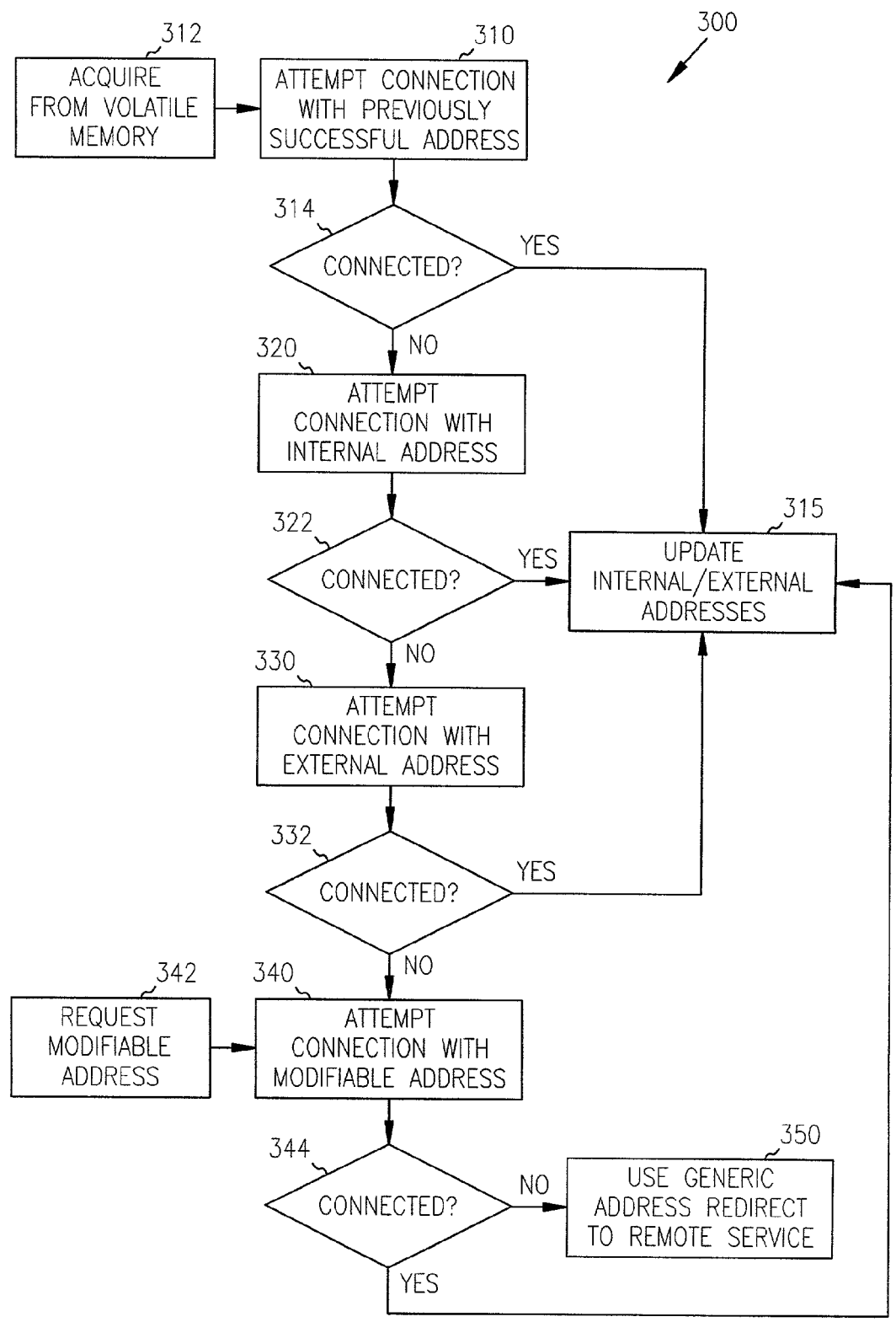
FIG. 3 is a flowchart representing a method of connecting to a remote service, according to the teachings of the present invention.

FIG. 3 illustrates a flowchart representing one method 300 for connecting to a remote service, according to the teachings of the present invention. In one embodiment, during installation a local service establishes a first connection to a remote service using a generic address that redirects the local service and acquires a valid address necessary for a valid connection between the local service and the remote service. The local service can establish local network connections (e.g., LAN, WAN, VPN, or any connection with a firewall where unauthorized access is restricted) to the remote service using an internal address, and the local service can establish external network connections (e.g., Internet connection or any connection outside the firewall) to the remote service using an external address. In some embodiments, the services are related to email systems, Intranet, systems, database systems, and the like. Further, in one embodiment, the addresses are in an IP or CIDR compatible format.

In 310 and after initial installation of the local service on a client-computing device, the local service makes a first attempt to connect with the remote service by using a previously successful connection address associated with a previously and last successful connection between the local service and the remote service. In one embodiment, the previously successful connection address is acquired from volatile memory associated with the client-computing device and accessible to the local service in 312. A check is made in 314, to determine if a successful connection is established, and if so, in 315 the remote service provides any updated internal and external connection addresses to the local service. Moreover, once a successful connection is made in method 300, all subsequently depicted attempts to connect with the remote service are terminated.

However, if a previously successful connection address is not detected in the volatile memory or does not result in a successful connection to the remote service, then in 320 the internal address is attempted to connect with the remote service. Again, in 322 a check is made to determine if a connection was established, and if so, in 315 the remote service provides any updated internal and external connection addresses to the local service.

Moreover, if the internal address does not result in a successful connection, then in 330 the external address is attempted to connect with the remote service. Accordingly, in 332 a check is made to determine if a connection was established, and if so, in 315 the remote service provides any updated internal and external connection addresses to the local service.

If the external address does not result in a successful connection, then in 340 a modifiable address is attempted to connect with the remote service. In some embodiments, the modifiable address is end user supplied during installation of the service, and/or the modifiable address is interactively requested and acquired through a manual interaction with the end user in 342 when the previous attempted addresses fail to establish a connection with the remote service. Moreover, in one embodiment, if the end user supplies the modifiable address, then the internal address, the external address, and any previously successful address are all cleared and flushed from volatile memory and the local service. Next, in 344 a check is made to determine if a connection was established, and if so, in 315 the remote service provides any updated internal and external connection addresses to the local service.

If still no connection is established with any previously successful address, internal address, external address, and modifiable address, then in 350 the original installation provided and generic redirection address is used to connect the local service with the remote service. And, once connected to the remote service in 315 the internal address and external address are reset by the remote service within the local service.

Furthermore, as one of ordinary skill in the art readily appreciates, method 300 can be configured such that during any connection attempt by the local service, redundant addresses are not tried twice. For example, if the previously successful address is the internal address then after an attempt to connect with the remote service is unsuccessful when using the previously successful address, the a connection attempt using the internal address can be bypassed. In this way, the latency associated with multiple attempts to connect with the remote service is minimized and optimized with the tenets of the present invention.

Figure 4:
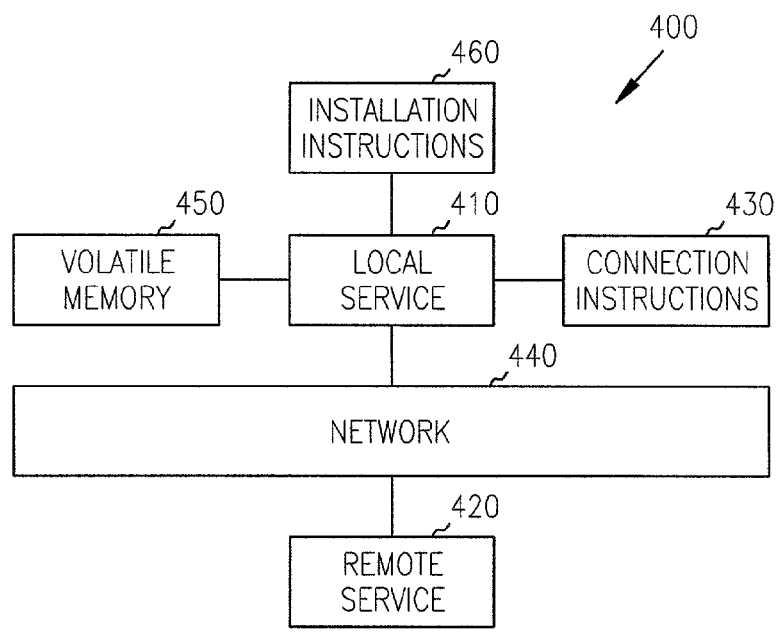
FIG. 4 is a block diagram of a connection system, according to the teachings of the present invention.

FIG. 4 illustrates a block diagram of one connection system 400, according to the teachings of the present invention. The connection system 400 includes a local service 410, a remote service 420, and a connection set of executable instructions (CSEI) 430. The local service 410 and the remote service 420 communicate with one another through a network 440. The communication can occur via a local network connection (e.g., LAN, WAN, VPN, or any connection with a firewall where unauthorized access is restricted) or an external network connection (e.g., Internet connection or any connection outside the firewall). Moreover, the local service 410 is associated with a client-computing device, a non-volatile memory, and a volatile memory 450. Similarly, the remote service 420 is associated with a server-computing device, a server non-volatile memory, and a server volatile memory.

Additionally in one embodiment, the system 400 includes an installation set of executable instructions (ISEI) 460. The ISEI 460 initially connects the local service 410 with the remote service 420 through the network 440 by using an intermediary service during installation of the local service 410 on the client-computing device. The intermediary service redirects the local service 410 to a valid connection address for the remote service 420 via the network 440. In this way, the local service 410 does not require any hard coded internal connection addresses or external connection addresses for the remote service 420. Moreover, once an initial and first installation connection is made between the local service 410 and the remote service 420 via the network 440 using the intermediary service, the remote service 420 provides valid internal and external addresses to the local service 410 to be used with subsequent connection attempts.

After installation of the local service 410 to the client-computing device and on any subsequent connection attempt made by the local service 410 to connect with the remote service 420, the CSEI 430 makes a first connection attempt using a local connection address associated with a local network connection between the local service 410 and the remote service 420 via the network 440. If the connection attempt fails, then the CSEI 430 attempts to connect the local service 410 with the remote service 420 by using an external connection address associated with an external network connection between the local service 410 and the remote service 420 via the network 440.

Moreover and in one embodiment, the CSEI 430 first scans the volatile memory 450 associated with the local service 410 for any last-used and successful local connection address or external connection address. In this way, the CSEI 430 intelligently selects a more probable address that will establish a connection between the local service 410 and the remote service 420, since a last successful connection address is more likely to result in a successful subsequent connection with the remote service 420. And, if the client-computing device is powered down (e.g., moving to a new location), then any volatile memory 450 acquired address is lost and will not be obtained or used when the CSEI 430 attempts a subsequent connection, since in this situation is probable that the local service 410 is switching between a local network connection and an external network connection, or vise versa.

Additionally and in more embodiments, if the CSEI 430 fails to establish a connection between the local service 410 and the remote service 420 using any volatile memory 450 acquired address, local connection address, or external connection address, then the CSEI 430 attempts to acquire a manually supplied and modifiable address for the remote service 420. If the modifiable address fails to result in a successful connection, then the intermediary service can be contacted to redirect the local service 410 to the remote service 420.

Also in some embodiments, each time the local service 410 is successfully connected to the remote service 420 via the network 440 the local connection address and the external connection address are updated/refreshed by the remote service 420 within the local service 410. The CSEI 430, in one embodiment, automatically initiates within the local service 410, each time the local service 410 attempts an operation that requires a connection to the remote service 420 and no existing connection between the local service 410 and the remote service 420 is detected.

Figure 5:
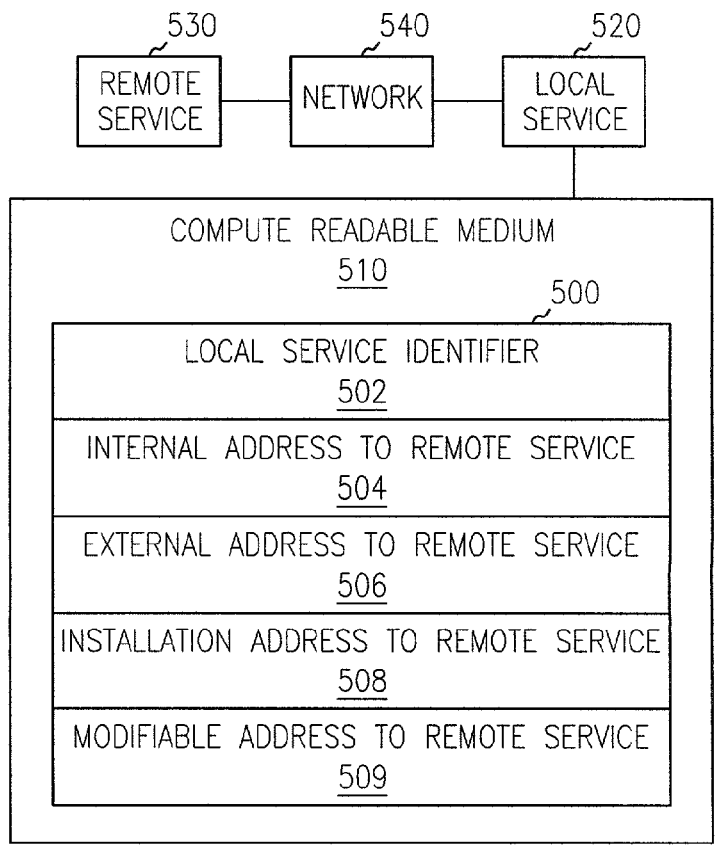
FIG. 5 is a block diagram of a remote connection data structure, according to the teachings of the present invention.

FIG. 5 illustrates a block diagram of one remote connection data structure 500, according to the teachings of the present invention. The data structure 500 includes a local service identifier 502 used to identify a particular local service 520, an internal address 504 used to identify and connect the local service 520 with a remote service 530 via a local network connection, an external address 506 used to identify and connect the local service 520 with the remote service 530 via an external network connection, an installation address 508 used to initially redirect the local service 520 to the remote service 530 during installation, and a modifiable address 509 used to acquire a manually provided identification to connect the local service 520 with the remote service 530.

The data structure 500 can reside on one or more computer readable media 510, and is accessible to the local service 520 residing on a client-computing device. In some embodiments, the computer readable medium 510 is volatile memory, non-volatile memory, or a combination of both volatile and non-volatile memories. Moreover, as one of ordinary skill in the art readily appreciates the data structure 500 need not be contiguously stored on the computer readable medium 510, since the information stored within the data structure 500 can be logically and/or dynamically assembled or otherwise acquired by the local service 520. Further, the local service 520 and the remote service 530 interact with one another via a network 540, once the local service 520 identifies the remote service 530 with a proper address associated with a proper network connection (e.g., local network connection or external network connection).

Once any valid connection between the local service 520 and the remote service 530 is established, the remote service 530 can update the data structure 500 via the local service 520. For example, during a connection between the local service 520 and the remote service 530, the remote service 530 provides the local service 520 with an updated internal address 504 and an updated external address 506. In this way, connections between the remote service 530 and the local service 520 keep data structure 500 in synch with changes occurring with respect to address locations for the remote service 530.

During initial installation of the local service 520 to a client-computing device, the values associated with internal address 504, the external address 506, and the modifiable address 509 can contain nil values. However, a value associated with the installation address 508 will include an address to a redirection service that identifies the local service 520 and redirects the local service 520 to the remote service 530. Once connected to the remote service 530, the remote service 530 then populates values for the internal address 504 and the external address 506 via local service 520 communications.

Moreover and in one embodiment, any values associated with the internal address 504 and the external address 506 are acquired by the local service 520 from a volatile memory associated with the local service 520 and used in a first connection attempt, which is subsequent to the installation connection. If any address values exist in the volatile memory, then these values represent a last and previously successful connection address used by the local service 520 to connect with the remote service 530. Furthermore, if the retrieved from volatile memory values are duplicative with the internal address 504 value or the external address value 506, and if the retrieved from volatile memory values fail to establish a connection with the remote service, then the duplicative values contained in the data structure 500 will not be retried by the local service 520 when attempting a different address for the remote service 530.

The local service 520 uses the internal address 504 of the data structure 500, in an attempt to connect with the remote service 530, after trying any address acquired from the volatile memory, assuming the volatile memory acquired address is not identical to the internal address 504. If this fails, the local service 520 uses the external address 506 to attempt to connect with the remote service 530, assuming the volatile memory acquired address is not identical to the external address 506 or identical to the internal address 504. Next, if no connection is established then the local service 520 attempts to connect with the remote service 530 using the modifiable address 509, assuming the modifiable address 509 is not identical to the volatile memory acquired address, the internal address 504, or the external address 506. If still no connection is established, the local service 520 uses the installation address 508 to acquire a valid connection to the remote service 530.

In some embodiments, the local service 520 and the remote service 530 are associated with email systems, database systems, Intranet systems, and the like. Moreover, the addresses are in an IP or CIDR compatible format, where the external address 506 is a proxy address used for an external network connection occurring between the local service 520 and the remote service 530.

As one of ordinary skill in the art now appreciates upon reading the present disclosure, a local service can more efficiently establish an automatic connection with a remote service, regardless of whether the connection with the remote service is a local connection or an external connection. Moreover, the teachings of the present invention more accurately select an appropriate address for the remote service by acquiring a previously successful address from a volatile memory associated with the local service.

In this way, the teachings of the present invention minimize connection latency to the remote service that is experienced when an incorrect address is used to attempt a connection with the remote service. This is particularly useful in email systems where an email client will frequently attempt to connect with an email server, where both local and external connections can exist. Although, as one of ordinary skill in the art readily appreciates any local service and remote service can benefit from the teachings of the present invention, and all such services are intended to fall within the broad scope of the present invention.

The foregoing description of various embodiments of the invention has been presented for purposes of illustration and description. It is not intended to be exhaustive nor to limit the invention to the precise form disclosed. Many alternatives, modifications, and variations will be apparent to those skilled in the art in light of the above teaching. For example, although various embodiments of the invention have been described as a series of sequential steps, the invention is not limited to performing any particular steps in any particular order. Accordingly, this invention is intended to embrace all alternatives, modifications, equivalents, and variations that fall within the spirit and broad scope of the attached claims.

What is claimed is:

1. A method to manage connection addresses for a remote service, comprising:
   retaining an internally accessible address associated with an internal and local connection to a remote service and retaining an externally accessible address associated with an external connection to the remote service during installation;
   scanning a memory for a previously successful address for the remote service associated with either the local connection or the external connection; and
   refreshing the internally accessible address and the externally accessible address when a connection is made to the remote service.

2. The method of claim 1, further comprising acquiring a modifiable address for the remote service.

3. The method of claim 1, wherein in scanning the memory, the memory is a volatile memory.

4. The method of claim 1, further comprising using a generic address during installation to redirect and acquire the internally accessible address and the externally accessible address on installation.

5. The method of claim 1, further comprising attempting to connect to the remote service using each of the addresses beginning with the previously successful address and terminating the attempts once connected to the remote service.

6. The method of claim 1 wherein in retaining, the remote service is an electronic mail service.

7. A method to connect with a remote service, comprising:
   attempting to connect to the remote service using a previously successful address associated with a previous connection to the remote service, wherein the previous connection is associated with an internal or local connection or an external connection;
   attempting to connect to the remote service using an internal address associated with the local connection to the remote service;
   attempting to connect to the remote service using an external address associated with the external connection to the remote service;
   attempting to connect to the remote service using a modifiable address associated with a manually provided connection to the remote service; and
   ceasing the attempts to connect with the remote service when a successful connection to the remote service is made.

8. The method of claim 7, further comprising connecting to the remote service using a generic address that redirects and acquires a valid address necessary for a valid connection with the remote service, if previous connection attempts fail.

9. The method of claim 7, further comprising updating the internal address and the external address when a connection is made to the remote service.

10. The method of claim 7, further comprising acquiring the previously successful address from a volatile memory.

11. The method of claim 7, wherein in processing the method, the attempts are made serially and in order starting with attempting to connect to the remote service using the previously successful address.

12. The method of claim 7, wherein in attempting to connect to the remote service using the previously successful address, each of the addresses are Internet Protocol (IP) addresses.

13. The method of claim 7, wherein in attempting to connect to the remote service using the modifiable address, the modifiable address is requested when attempts to connect to the remote service using the previously successful address, the internal address, and the external address fail.

14. A connection system, comprising:
   a local service;
   a remote service; and
   a connection set of executable instructions that automatically first attempts to connect the local service with the remote service using a local connection address for the remote service associated with a local connection and, if unsuccessful, next automatically attempts to connect the local service with the remote service using an external connection address for the remote service, wherein the external connection address is associated with an external connection.

15. The connection system of claim 14, further comprising an installation set of executable instructions that connects the local service with an intermediary service during installation, and wherein the intermediary service redirects the local service to the remote service.

16. The connection system of claim 15, wherein the connection set of executable instructions acquires the local connection address and the external connection address from the remote service once the local service is redirected to the remote service by the installation set of executable instructions.

17. The connection system of claim 14, wherein the connection set of executable instructions scans volatile memory associated with the local service for an updated local connection address or an updated external connection address before attempting to connect the local service with the remote service.

18. The connection system of claim 14, wherein connection set of executable instructions attempts to acquire a manually modifiable address for the remote service if the local connection address and the external connection address fail to connect the local service with the remote service.

19. The connection system of claim 14, wherein the connection set of executable instructions automatically initiates whenever the local service attempts to communicate with the remote service and when there are no existing connections between the local service and remote service.

20. The connection system of claim 14, wherein the connection set of executable instructions uses an existing Internet connection of the local service when attempting to connect the local service with the remote service.

21. A remote connection data structure used to connect a local service with a remote service and implemented within a computer-readable medium, the data structure comprising:
   a local service identifier used to uniquely identify the local service;
   an internal address associated with the local service identifier and used automatically by the local service to establish a local connection to the remote service; and
   an external address associated with the local service identifier and used automatically by the local service to establish an external connection to the remote service.

22. The remote connection data structure of claim 21, further comprising an installation address associated with the local service identifier and used to redirect the local service to the remote service during installation of the local service, and wherein the remote service provides the internal address and the external address once the local service is redirected to the remote service during installation.

23. The remote connection data structure of claim 21, wherein at least one of the internal address and the external address is acquired from a volatile memory associated with the local service.

24. The remote connection data structure of claim 21, further comprising a modifiable address for the remote service associated with the local service identifier and used to connect to the remote service if the internal address and the external address fail to connect the local service with the remote service.

25. The remote connection data structure of claim 21, wherein the remote service is at least one of a data base service, an email service, and an Intranet service.

* * * * *